United States Patent Office 3,504,027

Patented Mar. 31, 1970

3,504,027

NOVEL DIBENZOCYCLOHEPTENE-5-CARBONYLUREA AND INTERMEDIATES THEREOF

Martin A. Davis and Dusan M. Dvornik, Montreal, Quebec, Canada, assignors to American Home Products Corporation, New York, N.Y., a corporation of Delaware No Drawing. Filed Jan. 31, 1967, Ser. No. 612,779

Int. Cl. C07c *127/14*

U.S. Cl. 260—553 1 Claim

ABSTRACT OF THE DISCLOSURE

There are disclosed herein 10,11-dihydro-5H-dibenzo-[a,d]cycloheptene-5-carbonylurea as well as a process for preparing that compound via the intermediates, 2-(10,11-dihydro-5H-dibenzo[a,d]cyclohepten - 5 - ylidene)-oxabolidine-4,5-dione and 10,11-dihydro-5H-dibenzo[a,d]cycloheptene-5-carbonyl isocyanate which are also described. The compound of this invention is useful as an anticonvulsant and antibacterial agent, and formulations for its use are also given.

This invention relates to a novel compound having useful biological properties and to the novel chemical intermediates used for its preparation. More particularly, this invention relates to a novel carbonylurea, viz, 10,11-dihydro - 5H - dibenzo[a,d]cycloheptene-5-carbonylurea of the following Formula I:

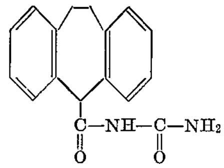

The novel compound of this invention is secured in the following manner: 10,11-dihydro-5H-dibenzo[a,d]cycloheptene-5-carboxamide of Formula II (prepared as described by M. A. Davis et al. in J. Med. Chem. 7, 88 (1964)) is heated with a small molar excess of oxalyl chloride in a suitable solvent such as, for example, ethylene dichloride, for a period of time sufficient to effect completion of the reaction, viz, in the range of about 16 hours. This general procedure of the condensation of oxalyl chloride with carboxamides has been described by A. J. Speziale and L. R. Smith in J. Org. Chem. 27, 3742 (1962) and 28, 1805, (1963). The product obtained after isolation in the conventional manner is 2-(10,11-dihydro-5H-dibenzo[a,d]cyclohepten-5-ylidene) - oxazolidine - 4,5 - dione of Formula III. This product is then heated at an elevated temperature in the range of from 200 to 250° C. whereby it is converted to 10,11-dihydro-5H-dibenzo[a,d] cycloheptene-5-carbonyl isocyanate of Formula IV. The isocyanate, in turn, is dissolved in an inert solvent such as, for example, anhydrous ether and added to an excess of liquid ammonia. This furnishes the carbonylurea of Formula I which is isolated and purified in the conventional manner.

The compound of this invention, Formula I, has useful biological properties and is of value as a medicament. In mammals, at doses considerably below those causing toxic manifestations, or signs of neurotoxicity it effectively inhibits convulsions caused by experimental administration of either electroshock or pentylenetetrazole and is an anticonvulsant agent. The anticonvulsant effect is elicited both upon injected and peroral administration and investigations in mammals indicate a high degree of absorption of the material. For use as an anticonvulsant agent, the compound may be formulated in the form of dry powder capsules, compressed tablets, or as a suspension in aqueous vehicles containing from 100 to 400 mg. of the active ingredients per unit dosage form. These dosage forms may be administered from twice to four times daily. In addition to its anticonvulsant effect, the compound has antibacterial activity against a number of microorganisms and is an antibacterial agent, especially effective against certain gram-positive and gram-negative organisms such as, for example, *Staphylococcus pyogenes* (both penicillin-sensitive and penicillin-resistant strains), *Sarcina lutea, Streptococcus faecalis, Escherichia coli, Aerobacter aerogenes, Salmonella pullorum, Pseudomonas aeruginosa, Proteus mirabilis,* and *Proteus vulgaris.*

In addition to being an intermediate for the preparation of the carbonylurea of Formula I, the intermediate oxazolidine-4,5-dione of Formula III also has useful biological properties. It is active against a number of gram-positive and gram-negative microorganisms and is an antibacterial agent. It is effective against certain gram-positive and gram-negative organisms such as, for example, *Staphylococus pyrogenes* (both penicillin sensitive and penicillin-resistant strains), *Sarcina lutea, Streptococcus faecalis, Escherichia coli, Aerobacter aerogenes, Salmonella pullorum, Pseudomonas aeruginosa, Proteus mirabilis,* and *Proteus vulgaris.* For this purpose, it may be formulated with suitable excipients in the form of lotions, ointments or creams, containing from 0.1 to 1 percent of the active ingredient and may be applied topically to the skin twice to four times daily. The compound further has activity against the parasite *Trichomonas vaginalis* and is a trichomonacidal agent. For this purpose, it may be formulated with suitable excipients in the form of vaginal inserts or vaginal suppositories each containing from 50 to 500 mg. of the active ingredient, and administered twice to four times daily for periods of time of from two to four weeks. Furthermore, the compound has activity against certain fungal microorganisms and is an antifungal agent.

The following formulae and descriptive examples will illustrate this invention.

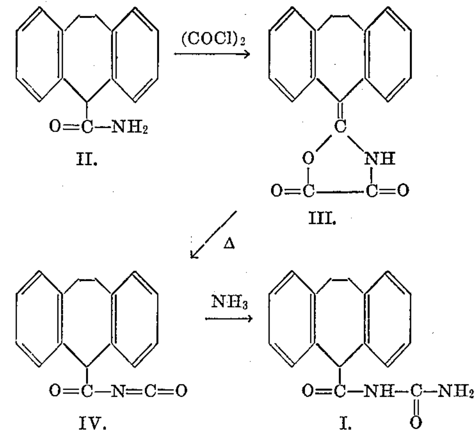

EXAMPLE 1

2 - (10,11 - dihydro - 5H - dibenzo[a,d]cyclohepten-5-ylidene)oxazolidine-4,5-dione (III)

A solution of 10,11-dihydro-5H-dibenzo[a,d]cycloheptene-5-carboxamide (II) (47.4 g.) in ethylene dichloride (250 ml.) containing oxalyl chloride (28.0 g.) is heated under reflux for sixteen hours. The reaction mixture is then evaporated in vacuo and the residual yellow oil is stirred with hexane. The yellow oil crystallizes to furnish the title product which is recrystallized from a mixture of ethylene dichloride and hexane to give a purified sample in the form of yellow needles having M.P. 207–208° C. Elemental analysis confirms the empirical formula $C_{18}H_{13}NO_3$, and the infrared and ultraviolet spectral data corroborate the assigned structure.

EXAMPLE 2

10,11 - dihydro - 5H - dibenzo[a,d]cycloheptene-5-carbonyl isocyanate (IV)

The oxazolidine-4,5-dione of Formula III, prepared as described in Example 1, is placed in a vacuum-sublimation apparatus, and heated in a Wood's metal bath at a temperature of 230–250° C. The temperature is lowered somewhat and a vacuum of about 0.1 to 1.0 mm. is applied, whereupon a yellow oil gradually distills and is collected on the cold finger. This oil, consisting of the title isocyanate, is separated from any unchanged starting material by dissolution in hexane and removal by filtration of any insoluble material. Evaporation of the solvent leaves the isocyanate which has a characteristic absorption in the infrared spectrum at 2240 $cm.^{-1}$. The material is sensitive to traces of moisture and is kept in a closed vessel.

EXAMPLE 3

10,11 - dihydro - 5H - dibenzo[a,d]cycloheptene-5-carbonylurea (I)

A solution of the isocyanate (IV), (3.0 g.), prepared as described in Example 2, in anhydrous ether (15 ml.) is added to an excess of liquid ammonia (100 ml.). The mixture is allowed to stand at room temperature until the ammonia has evaporated and the residual ether is removed in vacuo. The residual material is taken up in hot hexane, filtered and the filtrate is evaporated to furnish 2.2 g. of the title product. Recrystallization from ethyl acetate-hexane mixture or from acetonitrile furnishes a purified sample having M.P. 198–199° C. Elemental analysis confirms the empirical formula $C_{17}H_{16}N_2O_2$.

We claim:

1. 10,11-dihydro - 5H - dibenzo[a,d]cycloheptene-5-carbonylurea.

References Cited

UNITED STATES PATENTS

| | | | |
|---|---|---|---|
| 3,129,238 | 4/1964 | Davis | 260—453 |
| 3,138,608 | 6/1962 | Davis et al. | 260—307 |

FOREIGN PATENTS

| | | |
|---|---|---|
| 176,885 | 11/1966 | Russia. |
| 1,204,220 | 11/1965 | Germany. |

OTHER REFERENCES

Davis et al.: J. Med. Chem., vol. 7, no. 1, pp. 88–94, (1964).

LEON ZITVER, Primary Examiner

M. W. GLYNN, Assistant Examiner

U.S. Cl. X.R.

260—307, 453, 999; 424—272, 322